(12) United States Patent
Ladkat et al.

(10) Patent No.: US 11,661,558 B2
(45) Date of Patent: May 30, 2023

(54) APPARATUS AND PROCESS FOR HEATING HYDROISOMERIZATION FEED

(71) Applicant: UOP LLC, Des Plaines, IL (US)

(72) Inventors: Kiran Ladkat, Gurgaon (IN); Pallavi Luharuka, Kolkata (IN); John A. Petri, Wauconda, IL (US); Ashwin Singh Tensingh, Gurgaon (IN); Yoga R Ayar, Buffalo Grove, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 17/137,131

(22) Filed: Dec. 29, 2020

(65) Prior Publication Data
US 2022/0056352 A1 Feb. 24, 2022

(30) Foreign Application Priority Data
Aug. 21, 2020 (IN) .............................. 202011036102

(51) Int. Cl.
*C10G 65/12* (2006.01)
*B01J 19/24* (2006.01)
*B01J 19/00* (2006.01)

(52) U.S. Cl.
CPC .......... *C10G 65/12* (2013.01); *B01J 19/0013* (2013.01); *B01J 19/245* (2013.01); *B01J 2219/0004* (2013.01); *B01J 2219/00087* (2013.01); *B01J 2219/00121* (2013.01); *C10G 2300/4006* (2013.01)

(58) Field of Classification Search
CPC ............. C10G 65/12; C10G 2300/4006; B01J 19/0013; B01J 19/245; B01J 2219/0004; B01J 2219/00087; B01J 2219/00121
See application file for complete search history.

(56) References Cited

U.S. PATENT DOCUMENTS

| 5,385,663 | A | * | 1/1995 | Zimmerman | C10G 65/12 208/58 |
| 9,157,036 | B2 | | 10/2015 | Shih | |
| 10,208,260 | B2 | | 2/2019 | Shih et al. | |
| 2003/0019788 | A1 | * | 1/2003 | Benazzi | C10G 65/12 208/57 |
| 2007/0007177 | A1 | * | 1/2007 | Hunter | C10G 45/02 208/214 |
| 2012/0080288 | A1 | * | 4/2012 | Petri | B01D 3/141 196/46 |
| 2012/0261307 | A1 | | 10/2012 | Joseck et al. | |
| 2018/0002616 | A1 | * | 1/2018 | Kumar | C10G 65/12 |

FOREIGN PATENT DOCUMENTS

EP 2342013 B1 4/2020

OTHER PUBLICATIONS

European Search Report for corresponding EP Application No. 21192457.6 dated Dec. 13, 2021.

* cited by examiner

*Primary Examiner* — Ellen M McAvoy
*Assistant Examiner* — Chantel L Graham
(74) *Attorney, Agent, or Firm* — Paschall & Associates, LLC; James C. Paschall

(57) ABSTRACT

The process and apparatus of the disclosure utilize a heater between a hydroprocessing reactor and a hydroisomerization reactor. A hydroprocessing feed exchanger cools hydroprocessed effluent to effect turndown of heated hydroprocessed effluent so as to not feed the hydroprocessed effluent to the hydroisomerization reactor at a higher temperature than necessary.

20 Claims, 1 Drawing Sheet

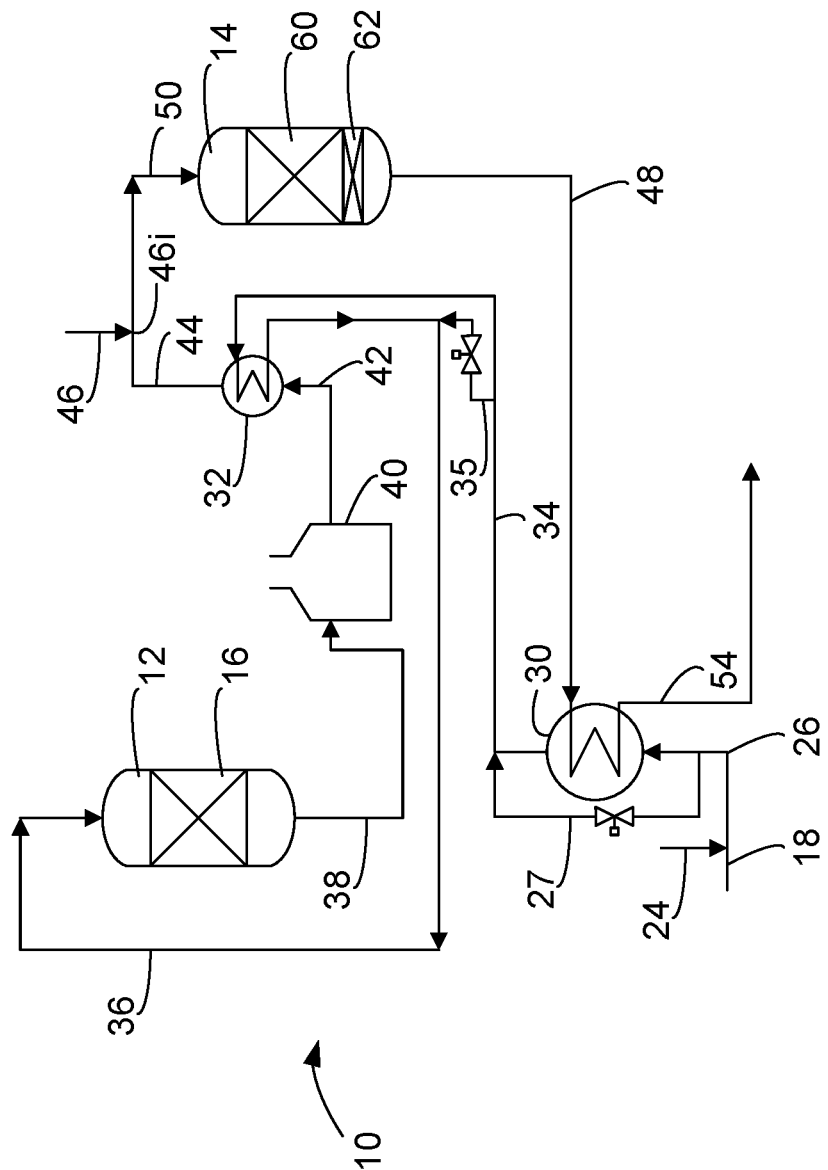

APPARATUS AND PROCESS FOR HEATING HYDROISOMERIZATION FEED

CROSS-REFERENCE TO RELATED APPLICATIONS

This application claims priority from Indian Provisional Application No, 202011036102, filed Aug. 21, 2020, incorporated herein in its entirety.

FIELD

The field is hydroprocessing of hydrocarbon feed streams. More specifically, the field is hydroisomerizing of hydroprocessed streams.

BACKGROUND

Hydroprocessing can include processes which convert hydrocarbons in the presence of hydroprocessing catalyst and hydrogen to more valuable products. Hydrotreating is a hydroprocessing process in which a hydrocarbon feedstock is contacted with hydrogen gas in the presence of one or more suitable catalysts for the removal of heteroatoms, such as sulfur, nitrogen and metals from a hydrocarbon feedstock. In hydrotreating, hydrocarbons with double and triple bonds may be saturated, and aromatics may also be saturated, as some hydrotreating processes are specifically designed to saturate aromatics.

Hydrocracking is a hydroprocessing process in which hydrocarbons crack in the presence of hydrogen and hydrocracking catalyst to lower molecular weight hydrocarbons. Depending on the desired output, a hydrocracking unit may contain one or more fixed beds of the same or different catalyst. Hydrocracking units may include one or two stages. In two-stage hydrocracking, unconverted oil (UCO) from a first hydrocracking reactor is fed to a second hydrocracking reactor.

Hydroisomerization or dewaxing is a hydroprocessing process that increases the alkyl branching on a hydrocarbon backbone in the presence of hydrogen and hydroisomerization catalyst to improve cold flow properties of the hydrocarbon.

Diesel fuel streams must meet cold flow property specifications particularly for colder climate fuel use. One cold flow property is "pour point" which is the temperature at which a hydrocarbon stream becomes semi-solid and loses its flow characteristics. A high pour point is generally associated with a higher normal paraffin content or a normal paraffin content comprising higher carbon number. Another cold flow property is "cloud point" which is the temperature below which wax in the hydrocarbon stream begins to form a cloudy appearance. The "cold filter plugging point" (CFPP) of diesel fuel is the temperature at which the presence of solidified waxes clogs fuel filters and injectors in engines. The wax also can accumulate on cold surfaces such as on a pipeline or heat exchanger tube and form an emulsion with water. And yet another cold flow property is "cloud point", which is the temperature at which the first instance of wax crystals form to produce a cloudy fuel. An improvement of a cold flow property is the reduction of the temperature in which the fuel begins to solidify.

When hydroprocessing gas oil, cold flow property specifications for diesel product can limit the obtainable diesel yield by requiring a lower diesel cut point between the diesel fuel and an unconverted oil (UCO) in a hydroprocessing unit. Unconverted oil (UCO) is the material boiling above the diesel cut point. Hydroisomerization can decrease the product diesel cold flow property temperature values without reducing the diesel cut point to preserve more diesel yield. In regions where distillate cold flow improvement is a challenge for meeting CFPP specifications ranging from −5 to −38° C. across summer and winter modes respectively due to large variation in ambient temperatures from −40 to 40° C., there is a need to have an optimally flexible process scheme that can accommodate cold flow improvement needs. There is a continuing need, therefore, for improved methods and apparatuses for hydroprocessing and hydroisomerizing hydrocarbon streams.

BRIEF SUMMARY

The process and apparatus of the disclosure utilize a heater between a hydroprocessing reactor and a hydroisomerization reactor and a hydroprocessing feed exchanger to cool hydroprocessed effluent to effect turndown of heated hydroprocessed effluent so as to not feed the hydroprocessed effluent to the hydroisomerization reactor at a higher temperature than necessary.

BRIEF DESCRIPTION OF THE DRAWINGS

The FIGURE is a schematic of the process and apparatus of the present disclosure.

DEFINITIONS

The term "communication" means that fluid flow is operatively permitted between enumerated components, which may be characterized as "fluid communication". The term "communication" may also mean that data or signals are transmitted between enumerated components which may be characterized as "informational communication".

The term "downstream communication" means that at least a portion of fluid flowing to the subject in downstream communication may operatively flow from the object with which it fluidly communicates.

The term "upstream communication" means that at least a portion of the fluid flowing from the subject in upstream communication may operatively flow to the object with which it fluidly communicates.

The term "direct communication" means that fluid flow from the upstream component enters the downstream component without passing through any other intervening vessel.

The term "indirect communication" means that fluid flow from the upstream component enters the downstream component after passing through an intervening vessel.

The term "bypass" means that the object is out of downstream communication with a bypassing subject at least to the extent of bypassing.

As used herein, the term "boiling point temperature" means atmospheric equivalent boiling point (AEBP) as calculated from the observed boiling temperature and the distillation pressure, as calculated using the equations furnished in ASTM D1160 appendix A7 entitled "Practice for Converting Observed Vapor Temperatures to Atmospheric Equivalent Temperatures".

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "T5" or "T95" means the temperature at which 5 mass percent or 95 mass percent, as the case may be, respectively, of the sample boils using ASTM D-86 or TBP.

As used herein, the term "initial boiling point" (IBP) means the temperature at which the sample begins to boil using ASTM D-7169, ASTM D-86 or TBP, as the case may be.

As used herein, the term "end point" (EP) means the temperature at which the sample has all boiled off using ASTM D-7169, ASTM D-86, D-1160 or TBP, as the case may be.

As used herein, the term "diesel boiling range" means hydrocarbons boiling in the range of an IBP between about 125° C. (257° F.) and about 175° C. (347° F.) or a T5 between about 150° C. (302° F.) and about 200° C. (392° F.) and the "diesel cut point" comprising a T95 between about 343° C. (650° F.) and about 399° C. (750° F.).

As used herein, the term "diesel cut point" is between about 343° C. (650° F.) and about 399° C. (750° F.) using the TBP distillation method.

As used herein, the term "diesel" means hydrocarbons boiling in the range using the True Boiling Point distillation method of a T5 between about 150° C. (302° F.) and about 200° C. (392° F.), and a T95 between about 343° C. (650° F.) and about 399° C. (750° F.).

As used herein, the term "diesel conversion" means conversion of feed that boils above the diesel cut point to material that boils at or below the diesel cut point in the diesel boiling range.

DETAILED DESCRIPTION

The process and apparatus of the disclosure utilize a heater between a hydroprocessing reactor and a hydroisomerization reactor and a hydroprocessing feed exchanger to cool hydroprocessed effluent to effect turndown of heated hydroprocessed effluent so as to not feed the hydroprocessed effluent to the hydroisomerization reactor at a higher temperature than necessary. Heating of the hydroprocessed effluent may be necessary during the colder climate months to ensure adequate cold flow property improvement of the hydrocarbon feed stream occurs. However, there may be times during the warmer climate months that cold flow property improvement of the hydrocarbon feed stream will not be necessary or significantly reduced resulting in no need to additionally heat and perhaps a need to cool the hydroprocessed effluent entering the hydroisomerization reactor. A hydroprocessing feed exchanger can be used to heat or cool down the heated hydroprocessed effluent. A hydroisomerization effluent heat exchanger can be used to heat the hydrocarbon feed to hydroprocessing reaction temperature. The process and apparatus eliminate the need for two fired heaters to sufficiently heat feed to each reactor.

Hydroisomerization is employed to improve cold flow properties so motor fuel can flow through fuel lines and filters during the colder climate months. However, cold flow properties are not necessarily a concern during summer months when ambient temperature is higher. Consequently, the hydroisomerization reactor does not need to be operated as severely or at all during warmer climate months. Hydroisomerization is best not performed if cold flow improvement is not necessary because hydroisomerization does slightly reduce yield of diesel product. The hydroisomerization reactor can be left on-line in the summer months but turned down or off so as to afford less or no hydroisomerization conversion. By cooling the hydroisomerization feed to an appropriately low isomerization reactor inlet temperature, the hydroisomerization catalyst will catalyze little or no hydroisomerization.

Catalyst typically deactivates over its cycle length expectancy. Reaction temperature is increased over the cycle of the catalyst from the start to the end of a reaction run to account for catalyst deactivation. We have found in some cases, hydroisomerization catalyst deactivates more slowly than hydrotreating catalyst.

As a result of these phenomena, the hydroisomerization inlet temperature is typically higher than hydroprocessed effluent temperature during the cold climate months of operation with the highest cold flow property improvement. However, in the summer months, there can be periods in which the hydroisomerization inlet temperature is lower than the hydroprocessing effluent temperature. Consequently, the hydroprocessed effluent must be cooled before entering the hydroisomerization reactor.

Turning to the FIGURE, an apparatus and process 10 for hydroprocessing and hydroisomerizing a hydrocarbon stream comprise a hydroprocessing reactor 12 and a hydroisomerization reactor 14. A hydrocarbon stream in hydrocarbon line 18 and a hydrogen stream in hydrogen line 24 are fed to the hydroprocessing reactor 12.

In one aspect, the process and apparatus 10 described herein are particularly useful for hydroprocessing a hydrocarbon feed stream comprising a hydrocarbonaceous feedstock. Illustrative hydrocarbonaceous feed stocks include hydrocarbon streams having initial boiling points (IBP) above about 288° C. (550° F.), such as atmospheric gas oils, vacuum gas oil (VGO) having T5 and T95 between about 315° C. (600° F.) and about 600° C. (1100° F.), deasphalted oil, coker distillates, straight run distillates, pyrolysis-derived oils, high boiling synthetic oils, cycle oils, hydrocracked feeds, and catalytic cracker distillates. A preferred hydrocarbon feed stream is a diesel feed stream comprising hydrocarbons boiling in the range of an IBP between about 125° C. (257° F.) and about 175° C. (347° F.) or a T5 between about 150° C. (302° F.) and about 200° C. (392° F.) and the "diesel cut point" comprising a T95 between about 343° C. (650° F.) and about 399° C. (750° F.).

A hydrogen stream in hydrogen line 24 may join the hydrocarbon stream in the hydrocarbon line 18 to provide a hydrocarbon feed stream in a hydrocarbon feed line 26. The hydrocarbon feed stream in the hydrocarbon feed line 26 may be preheated by heat exchange with a hydroisomerized effluent stream in the hydroisomerized effluent line 48 in a hydroisomerization effluent exchanger 30 having a hot side in downstream communication with the hydroisomerization reactor 14 and a cool side of the hydroisomerization effluent exchanger 30 in downstream communication with the hydrocarbon feed line 26. A preheated hydrocarbon feed stream exits the cool side of the hydroisomerization effluent exchanger 30 in a preheat line 34.

The preheated hydrocarbon feed stream may be further heated in a hydroprocessing feed heat exchanger 32 by heat exchange with a heated hydroprocessed effluent stream. The hydroprocessing feed heat exchanger has a cool side in downstream communication with the cool side of the hydroisomerization effluent exchange 30 via the preheat line 34. By passing through the cool sides of the isomerization effluent heat exchanger 30 and the hydroprocessing feed heat exchanger 32, the hydrocarbon feed stream may be heated to hydroprocessing reaction temperature of about 340 to about 427° C. or to about 380° C. depending on where the catalyst is in its life cycle to provide a heated hydrocarbon feed stream.

The heated hydrocarbon feed stream may be fed to the hydroprocessing reactor 12 in a heated hydrocarbon feed line 36. The heated hydrocarbon feed stream is hydroprocessed in the presence of hydrogen over a bed 16 of hydroprocessing catalyst to produce a hydroprocessed effluent stream in the hydroprocessing reactor 12. The hydroprocessing reactor may be a hydrocracking reactor or a hydrotreating reactor. For purposes of this description, the hydroprocessing reactor 12 will be described as a hydrotreating reactor.

Hydrotreating is a process wherein hydrogen is contacted with hydrocarbon in the presence of hydrotreating catalysts which are primarily active for the removal of heteroatoms, such as sulfur, nitrogen, oxygen and metals from the hydrocarbon feedstock. In hydrotreating, hydrocarbons with double and triple bonds such as olefins may be saturated. Aromatics may also be saturated. Some hydrotreating processes are specifically designed to saturate aromatics.

The hydroprocessing reactor 12 may comprise a guard bed of hydrotreating catalyst followed by one or more beds 16 of higher activity hydrotreating catalyst. The guard bed filters particulates and reacts with contaminants in the hydrocarbon feed stream such as metals like nickel, vanadium, silicon and arsenic which are detrimental to the higher activity hydrotreating catalyst. The guard bed may comprise material similar to the hydrotreating catalyst.

Suitable hydrotreating catalysts for use in the present disclosure are any known conventional hydrotreating catalysts and include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable hydrotreating catalysts include zeolitic catalysts, as well as noble metal catalysts where the noble metal is selected from palladium and platinum. More than one type of hydrotreating catalyst may be used in the same hydrotreating reactor 12. The Group VIII metal is typically present in an amount ranging from about 2 to about 20 wt %, preferably from about 4 to about 12 wt %. The Group VI metal will typically be present in an amount ranging from about 1 to about 25 wt %, preferably from about 2 to about 25 wt %.

Preferred reaction conditions in the hydrotreating reactor 12 include a temperature from about 290° C. (550° F.) to about 455° C. (850° F.), suitably 316° C. (600° F.) to about 427° C. (800° F.), a pressure from about 2.1 MPa (gauge) (300 psig), preferably 4.1 MPa (gauge) (600 psig) to about 20.6 MPa (gauge) (3000 psig), suitably 12.4 MPa (gauge) (1800 psig), a liquid hourly space velocity of the fresh hydrocarbonaceous feedstock from about 0.1 hr$^{-1}$, suitably 4 hr$^{-1}$%, to about 8 hr$^{-1}$, preferably from about 1.5 to about 3.5 hr$^{-1}$, and a hydrogen rate of about 168 Nm$^3$/m$^3$ (1,000 scf/bbl), to about 1,011 Nm$^3$/m$^3$ oil (6,000 scf/bbl), preferably about 168 Nm$^3$/m$^3$ oil (1,000 scf/bbl) to about 674 Nm$^3$/m$^3$ oil (4,000 scf/bbl), with a hydrotreating catalyst or a combination of hydrotreating catalysts.

The hydrotreating reactor 12 provides a hydrotreated stream that exits the hydrotreating reactor in a hydrotreating effluent line 38. The hydrogen gas laden with ammonia and hydrogen sulfide may be removed from the hydrotreated hydrocarbon stream in a separator or a stripper, but the hydrotreated hydrocarbon stream may also be fed directly to the hydroisomerization reactor 14 without separation or stripping.

In an embodiment, the hydroprocessed effluent stream in the hydroprocessed effluent line 38 may be at an outlet temperature of 350 to 390° C. due to the preponderance of exothermic saturation reactions depending on the composition of the feed. The hydroisomerization reactor inlet temperature may range from 380 to 390° C. in the colder climate months from start to end of run. However, in the warmer climate months, the hydroisomerization reactor inlet temperature of the hydroisomerization feed in the hydroisomerization feed line 50 can range from 350 to 380° C. from start to end of run. The hydroprocessed effluent stream is periodically hotter at discharge from the hydroprocessing reactor 12 than the feed to the hydroisomerization reactor 14. Consequently, although most of the time, the hydroprocessed effluent stream must be heated to hydroisomerization reactor inlet temperature, the heat regime must be sufficiently flexible to heat or cool the hydroprocessed effluent stream to the desired hydroisomerization reactor inlet temperature.

The hydroprocessed effluent stream in the hydroprocessed effluent line 38 may be heated in a heater 40 to provide a heated hydroprocessed effluent stream. The heater 40 may be in downstream communication with the hydroprocessing reactor 12 through hydroprocessed effluent line 38.

The heater 40 may be a fired heater that burns fuel oil or another hydrocarbon to generate heat that raises the temperature of the hydroprocessed effluent stream in the hydroprocessed effluent line 38. A heated hydroprocessed effluent stream exits the heater 40 in the heated hydroprocessed line 42. However, the heated hydroprocessed stream may be at a temperature that is above the desired hydroisomerization reactor inlet temperature. Accordingly, the heated hydroprocessed effluent stream may be cooled by heat exchange with the preheated hydrocarbon feed stream in the preheated hydrocarbon feed line 34. A hot side of the hydroprocessing feed heat exchanger 32 may be in downstream communication with the heater 40. The heated hydroprocessed effluent stream in line 42 may be cooled in the hydroprocessing feed heat exchanger 32 while heating the preheated hydrocarbon feed stream 34 on the cool side of the hydroprocessing feed heat exchanger. A cooled hydroprocessed effluent stream exits the hot side of the hydroprocessing feed heat exchanger 32 in a cooled hydroprocessed effluent line 44.

In some cases or times, the preheated hydrocarbon feed stream in the preheated hydrocarbon feed line 34 may be too hot to sufficiently cool the heated hydroprocessed feed stream. Hydroisomerizing the hydroprocessed effluent stream more than needed will diminish product yield. Bypasses 27 and 35 controlled by control valves thereon may be provided around the hydroisomerization effluent exchanger 30 and the hydroprocessing feed exchanger 32, respectively, to reduce the heat transferred from the hot stream in the hot side to the cool stream in the cool side of the heat exchanger. When the reactor inlet temperature for the hydroisomerization reactor 14 is not or not much higher than the hydroprocessed effluent temperature, the heater 40 need not be turned down to a lower heating level. Instead, bypassing across the hydroprocessing feed heat exchanger 32 provides the necessary temperature control for the inlet temperature for the hydroisomerization reactor 14. This arrangement will enable a steady increase in output across heater throughout the cycle thereby improving the operation. Additionally, a quench stream from line 46 may be added to the cooled hydroprocessed effluent stream after heat exchanging the preheated hydrocarbon feed stream with the heated hydroprocessed effluent stream in the hydroprocessing feed exchanger 32. A quench inlet 46i may be located on the cooled hydroprocessed effluent line 44 in downstream communication with the hot side of the hydroprocessing feed exchanger 32 between the hydroprocessing feed exchanger and the hydroisomerization reactor 14. The quench stream in line 46 may be cooled hydrogen which may supplement hydrogen requirements in the hydroisomerization reactor 14 or it may be cooler or cooled hydrocarbon product liquid. A quenched hydroprocessed effluent stream flows past the quench inlet 46i in a hydroisomerization feed line 50.

In order to provide necessary heat to the combined feed in exchanger 32, the charge heater 40 outlet temperature may be higher than 400° C. This high temperature operation at the charge heater 40 outlet can potentially cause the color issue in the final diesel product. To mitigate this color issue in the final diesel product, in an embodiment, a layer of post-treat hydrotreating catalyst is preferably located in the bottom of the hydroisomerization reactor 14.

The hydroisomerization reactor 14 may be in downstream communication with the hot side of the hydroprocessing feed heat exchanger 32 and perhaps with quench inlet 46. In the hydroisomerization reactor 14, the heated, cooled and/or quenched hydroprocessed effluent stream in the hydroisomerization feed line 50 is hydroisomerized in the presence of hydrogen over a bed 60 of hydroisomerization catalyst to produce a hydroisomerized effluent stream. Furthermore, a bed 62 of post-treat hydrotreating catalyst may be installed in the hydroisomerization reactor 14 downstream of the bed 60 of hydroisomerization catalyst or in a vessel in direct downstream communication with the hydroisomerization reactor 14 to saturate trace olefins that are formed as part of the hydroisomerization reaction mechanism to mitigate mercaptan formation.

The hydroisomerization catalyst can comprise an unbound 10-member ring pore, one-dimensional zeolite in combination with a low surface area metal oxide refractory binder, both of which are selected to obtain a high ratio of micropore surface area to total surface area. Alternatively, the zeolite has a low silica to alumina ratio. Suitable catalysts include 10-member ring pore zeolites, such as EU-1, ZSM-35 (or ferrierite), ZSM-11, ZSM-57, NU-87, SAPO-11, and ZSM-22. Preferred materials are EU-2, EU-11, ZBM-30, ZSM-48, or ZSM-23. ZSM-48 is most preferred. Note that a zeolite having the ZSM-23 structure with a silica to alumina ratio of from about 20:1 to about 40:1 can sometimes be referred to as SSZ-32. Other molecular sieves that are isostructural with the above materials include Theta-1, NU-10, EU-13, KZ-1, and NU-23.

The hydroisomerization catalyst can further include a metal hydrogenation function, such as a Group VI or Group VIII metal, and suitably a Group VIII noble metal. The metal hydrogenation component is typically a Group VI and/or a Group VIII metal. The metal hydrogenation component may be a Group VIII noble metal. Preferably, the metal hydrogenation component is a combination of a non-noble Group VIII metal with a Group VI metal. Suitable combinations can include nickel, cobalt, or iron with molybdenum or tungsten, preferably nickel with molybdenum or tungsten.

The metal hydrogenation component may be added to the catalyst in any convenient manner. One technique for adding the metal hydrogenation component is by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor is added to a mixture of zeolite (or zeolite and binder) prior to extrusion.

The amount of metal in the catalyst can be at least about 0.1 wt % to about 10 wt % based on catalyst. Preferably, the hydroisomerization catalysts have a low ratio of silica to alumina. In various embodiments, the ratio of silica to alumina can be from 30:1 to 200:1, 60:1 to 110:1, or 70:1 to 100:1. The hydroisomerization catalysts may also include an optional binder having a low surface area such as 100 m$^2$/g or less, or 80 m$^2$/g or less, or 70 m$^2$/g or less. A zeolite can be combined with binder by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture. The amount of framework alumina in the catalyst may range from 0.1 to 3.33 wt %, or 0.1 to 2.7 wt %, or 0.2 to 2 wt %, or 0.3 to 1 wt %.

The hydroisomerization catalyst maintains catalytic activity even if substantial sulfur is present in the hydrocracked stream such as when hydrogen sulfide gas is not removed from the hydrogen stream following hydroprocessing. The hydroprocessed stream may contain up to about 4.0 wt % at least about 0.1 wt % of sulfur and be effectively hydroisomerized. Sulfur content may be measured by standard ASTM methods D2622.

In order to mitigate the color problem in the final diesel product, it may be necessary to include the bed 62 of post-treat catalyst below the hydroisomerization catalyst in the hydroisomerization reactor 14. Suitable post-treat hydrotreating catalysts for use in the present disclosure are any known conventional hydrotreating catalysts and include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable post-treat hydrotreating catalysts include zeolitic catalysts, as well as noble metal catalysts in which the noble metal is selected from palladium and platinum. More than one type of post treat hydrotreating catalyst may be used in the bottom of the hydroisomerization reactor 14. The Group VIII metal is typically present in an amount ranging from about 2 to about 20 wt %, preferably from about 4 to about 12 wt %. The Group VI metal will typically be present in an amount ranging from about 1 to about 25 wt %, preferably from about 2 to about 25 wt %.

Process conditions in the hydroisomerization catalyst bed may include a temperature of from 200 to 450° C., preferably 270 to 400° C., a hydrogen partial pressure of from 1.8 mPa (250 psi) to 34.6 mPa (5000 psi), preferably 4.8 mPa (667 psi) to 20.8 mPa (3005 psi), a liquid hourly space velocity of from 0.2 to 10 v/v/hr, preferably 4 to 8 v/v/hr, and a hydrogen circulation rate of from 35.6 Nm$^3$/m$^3$ (200 scf/B), to 1781 Nm$^3$/m$^3$ (10,000 scf/B), preferably 890 Nm$^3$/m$^3$ (5000 scf/B) to 1424 Nm$^3$/m$^3$ (8000 scf/B). In an embodiment, the hydroisomerized effluent stream may range from 350 to about 400° C.

A hot side of the hydroisomerized effluent heat exchanger 30 may be in downstream communication with the hydroisomerization reactor 14. The hydroisomerized effluent stream in the hydroisomerized effluent line 48 may impart heat to the hydrocarbon feed stream in the hydrocarbon feed line 26 on the cool side of the hydroisomerized effluent heat exchanger 30. The cooled hydroisomerized effluent stream exits the hydroisomerized effluent heat exchanger 30 in line 54 to be further processed for product recovery.

Accordingly, a process and apparatus are provided for hydroprocessing and hydroisomerizing a hydrocarbon feed stream but only requiring one heater 40 and being flexible to provide feeds at requisite temperatures in cold and warm seasons.

Specific Embodiments

While the following is described in conjunction with specific embodiments, it will be understood that this description is intended to illustrate and not limit the scope of the preceding description and the appended claims.

A first embodiment of the disclosure is a process for hydroprocessing and hydroisomerizing a hydrocarbon feed stream comprising heating the hydrocarbon feed stream by heat exchange with a heated hydroprocessed effluent stream; hydroprocessing the hydrocarbon feed stream in the presence of hydrogen over a hydroprocessing catalyst to produce a hydroprocessed effluent stream; heating the hydroprocessed effluent stream to provide the heated hydroprocessed effluent stream; hydroisomerizing the heated hydroprocessed effluent stream in the presence of hydrogen over a hydroisomerization catalyst to produce a hydroisomerized effluent stream. An embodiment of the disclosure is one, any or all of prior embodiments in this paragraph up through the first embodiment in this paragraph further comprising preheating the hydrocarbon feed stream by heat exchanging the hydrocarbon feed stream with the hydroisomerized effluent stream prior to heating the hydrocarbon feed stream. An embodiment of the disclosure is one, any or all of prior embodiments in this paragraph up through the first embodiment in this paragraph further comprising adding a hydrogen stream to the hydrocarbon feed stream prior to preheating the hydrocarbon feed stream. An embodiment of the disclosure is one, any or all of prior embodiments in this paragraph up through the first embodiment in this paragraph further comprising adding a quench stream to the hydroprocessed effluent stream after heat exchanging the hydrocarbon feed stream with the heated hydroprocessed effluent stream. An embodiment of the disclosure is one, any or all of prior embodiments in this paragraph up through the first embodiment in this paragraph further comprising heating the hydroprocessed effluent stream in a fired heater. An embodiment of the disclosure is one, any or all of prior embodiments in this paragraph up through the first embodiment in this paragraph wherein the hydroprocessed effluent stream is periodically hotter at discharge from a hydroprocessing reactor than when fed to a hydroisomerization reactor. An embodiment of the disclosure is one, any or all of prior embodiments in this paragraph up through the first embodiment in this paragraph further comprising cooling the heated hydroprocessed effluent stream by heat exchange with the hydrocarbon feed stream. An embodiment of the disclosure is one, any or all of prior embodiments in this paragraph up through the first embodiment in this paragraph further comprising hydrotreating the hydroisomerized effluent stream prior to heat exchange.

A second embodiment of the disclosure is an apparatus for hydroprocessing and hydroisomerizing a hydrocarbon feed stream comprising a hydroprocessing feed heat exchanger; a hydroprocessing reactor in downstream communication with a cool side of the hydroprocessing feed heat exchanger; a heater in downstream communication with the hydroprocessing reactor; a hot side of the hydroprocessing feed heat exchanger in downstream communication with the heater; and a hydroisomerization reactor in downstream communication with the hot side of the hydroprocessing feed heat exchanger. An embodiment of the disclosure is one, any or all of prior embodiments in this paragraph up through the second embodiment in this paragraph further comprising a hydroisomerization effluent exchanger having a hot side in downstream communication with the hydroisomerization reactor and the cool side of the hydroprocessing feed exchanger in downstream communication with a cool side of the hydroisomerization effluent exchanger. An embodiment of the disclosure is one, any or all of prior embodiments in this paragraph up through the second embodiment in this paragraph wherein the heater is a fired heater. An embodiment of the disclosure is one, any or all of prior embodiments in this paragraph up through the second embodiment in this paragraph further including a quench inlet on the line between the hydroprocessing feed exchanger and the hydroisomerization reactor. An embodiment of the disclosure is one, any or all of prior embodiments in this paragraph up through the second embodiment in this paragraph further including a bypass across the hydroprocessing feed heat exchanger. An embodiment of the disclosure is one, any or all of prior embodiments in this paragraph up through the second embodiment in this paragraph further including a bypass across the hydroisomerization effluent heat exchanger.

A third embodiment of the disclosure is a process for hydroprocessing and hydroisomerizing a hydrocarbon feed stream comprising heating the hydrocarbon feed stream by heat exchange with a heated hydroprocessed effluent stream; hydroprocessing the hydrocarbon feed stream in the presence of hydrogen over a hydroprocessing catalyst to produce a hydroprocessed effluent stream; heating the hydroprocessed effluent stream to provide the heated hydroprocessed effluent stream; cooling the heated hydroprocessed effluent stream to provide a cooled, heated hydroprocessed effluent stream; and hydroisomerizing the cooled, heated hydroprocessed effluent stream in the presence of hydrogen over a hydroisomerization catalyst to produce a hydroisomerized effluent stream. An embodiment of the disclosure is one, any or all of prior embodiments in this paragraph up through the third embodiment in this paragraph wherein the cooling step is performed by heat exchanging heated hydroprocessed effluent stream with the hydrocarbon feed stream. An embodiment of the disclosure is one, any or all of prior embodiments in this paragraph up through the third embodiment in this paragraph further comprising preheating the hydrocarbon feed stream by heat exchanging the hydrocarbon feed stream with the hydroisomerized effluent stream prior to heating the hydrocarbon feed stream. An embodiment of the disclosure is one, any or all of prior embodiments in this paragraph up through the third embodiment in this paragraph further comprising adding a quench stream to the hydroprocessed effluent stream after heat exchanging the hydrocarbon feed stream with the heated hydroprocessed effluent stream. An embodiment of the disclosure is one, any or all of prior embodiments in this paragraph up through the third embodiment in this paragraph further comprising heating the hydroprocessed effluent stream in a fired heater. An embodiment of the disclosure is one, any or all of prior embodiments in this paragraph up through the third embodiment in this paragraph wherein the hydroprocessed effluent stream is periodically hotter at discharge from a hydroprocessing reactor than when fed to a hydroisomerization reactor.

Without further elaboration, it is believed that using the preceding description that one skilled in the art can utilize the present disclosure to its fullest extent and easily ascertain the essential characteristics of this disclosure, without departing from the spirit and scope thereof, to make various changes and modifications of the disclosure and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for hydroprocessing and hydroisomerizing a hydrocarbon feed stream comprising:
   heating said hydrocarbon feed stream by heat exchange with a heated hydroprocessed effluent stream;
   hydroprocessing said hydrocarbon feed stream in the presence of hydrogen over a hydroprocessing catalyst to produce a hydroprocessed effluent stream;
   heating said hydroprocessed effluent stream to provide said heated hydroprocessed effluent stream;
   hydroisomerizing said heated hydroprocessed effluent stream in the presence of hydrogen over a hydroisomerization catalyst to produce a hydroisomerized effluent stream.

2. The process of claim 1 further comprising preheating said hydrocarbon feed stream by heat exchanging said hydrocarbon feed stream with said hydroisomerized effluent stream prior to heating said hydrocarbon feed stream.

3. The process of claim 2 further comprising adding a hydrogen stream to said hydrocarbon feed stream prior to preheating said hydrocarbon feed stream.

4. The process of claim 1 further comprising adding a quench stream to said hydroprocessed effluent stream after heat exchanging said hydrocarbon feed stream with said heated hydroprocessed effluent stream.

5. The process of claim 1 further comprising heating said hydroprocessed effluent stream in a fired heater.

6. The process of claim 1 wherein said hydroprocessed effluent stream is periodically hotter at discharge from a hydroprocessing reactor than when fed to a hydroisomerization reactor.

7. The process of claim 1 further comprising cooling said heated hydroprocessed effluent stream by heat exchange with said hydrocarbon feed stream.

8. The process of claim 1 further comprising hydrotreating said hydroisomerized effluent stream prior to heat exchange.

9. An apparatus for hydroprocessing and hydroisomerizing a hydrocarbon feed stream comprising:
   a hydroprocessing feed heat exchanger;
   a hydroprocessing reactor in downstream communication with a cool side of said hydroprocessing feed heat exchanger;
   a heater in downstream communication with said hydroprocessing reactor;
   a hot side of said hydroprocessing feed heat exchanger in downstream communication with said heater; and
   a hydroisomerization reactor in downstream communication with said hot side of said hydroprocessing feed heat exchanger.

10. The apparatus of claim 9 further comprising a hydroisomerization effluent exchanger having a hot side in downstream communication with said hydroisomerization reactor and said cool side of said hydroprocessing feed exchanger in downstream communication with a cool side of said hydroisomerization effluent exchanger.

11. The apparatus of claim 9 wherein said heater is a fired heater.

12. The apparatus of claim 9 further including a quench inlet on the line between the hydroprocessing feed exchanger and said hydroisomerization reactor.

13. The apparatus of claim 9 further including a bypass across the hydroprocessing feed heat exchanger.

14. The apparatus of claim 9 further including a bypass across the hydroisomerization effluent heat exchanger.

15. A process for hydroprocessing and hydroisomerizing a hydrocarbon feed stream comprising:
   heating said hydrocarbon feed stream by heat exchange with a heated hydroprocessed effluent stream;
   hydroprocessing said hydrocarbon feed stream in the presence of hydrogen over a hydroprocessing catalyst to produce a hydroprocessed effluent stream;
   heating said hydroprocessed effluent stream to provide said heated hydroprocessed effluent stream;
   cooling said heated hydroprocessed effluent stream to provide a cooled, heated hydroprocessed effluent stream; and
   hydroisomerizing said cooled, heated hydroprocessed effluent stream in the presence of hydrogen over a hydroisomerization catalyst to produce a hydroisomerized effluent stream.

16. The process of claim 15 wherein said cooling step is performed by heat exchanging heated hydroprocessed effluent stream with said hydrocarbon feed stream.

17. The process of claim 15 further comprising preheating said hydrocarbon feed stream by heat exchanging said hydrocarbon feed stream with said hydroisomerized effluent stream prior to heating said hydrocarbon feed stream.

18. The process of claim 15 further comprising adding a quench stream to said hydroprocessed effluent stream after heat exchanging said hydrocarbon feed stream with said heated hydroprocessed effluent stream.

19. The process of claim 15 further comprising heating said hydroprocessed effluent stream in a fired heater.

20. The process of claim 15 wherein said hydroprocessed effluent stream is periodically hotter at discharge from a hydroprocessing reactor than when fed to a hydroisomerization reactor.

* * * * *